(12) United States Patent  (10) Patent No.: US 12,299,791 B2
Naseby et al.  (45) Date of Patent: May 13, 2025

(54) SYSTEMS AND METHODS FOR AUTOMATICALLY GENERATING DESIGNS

(71) Applicant: Canva Pty Ltd, Surry Hills (AU)

(72) Inventors: David Naseby, Sydney (AU); Gloria Lo, Sydney (AU); Michael Wu, Melbourne (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/592,492

(22) Filed: Feb. 29, 2024

(65) Prior Publication Data
US 2024/0296610 A1  Sep. 5, 2024

(30) Foreign Application Priority Data
Mar. 1, 2023  (AU) .............................. 2023201259

(51) Int. Cl.
G06F 3/048  (2013.01)
G06F 3/0482  (2013.01)
G06F 3/0486  (2013.01)
G06T 11/60  (2006.01)

(52) U.S. Cl.
CPC ............ G06T 11/60 (2013.01); G06F 3/0482 (2013.01); G06F 3/0486 (2013.01); G06T 2200/24 (2013.01)

(58) Field of Classification Search
None
See application file for complete search history.

(56) References Cited

U.S. PATENT DOCUMENTS

| 8,005,904 B2 | 8/2011 | Yokoyama et al. |
| 10,984,183 B1* | 4/2021 | Clediere ............... G06F 3/0482 |
| 11,756,246 B2* | 9/2023 | O'Donovan .......... G06T 11/001 |
| | | 345/634 |
| 2005/0278625 A1 | 12/2005 | Wessling et al. |
| 2006/0174199 A1 | 8/2006 | Soltis et al. |

(Continued)

FOREIGN PATENT DOCUMENTS

WO  2001/011491 A1  2/2001

OTHER PUBLICATIONS

Canvas in Zoho CRM, https://www.youtube.com/watch?v=fZII-nKmPtc, Upload Date: May 16, 2018, Screenshots captured on Mar. 7, 2024, pp. 1-4.

(Continued)

*Primary Examiner* — Thanh T Vu
(74) *Attorney, Agent, or Firm* — GrowIP Law Group LLC

(57) ABSTRACT

Described herein is a computer implemented method for generating a plurality of synthesised designs based on a selected design that includes a first element. The method includes accessing design generation data that includes source data and field association data. The source data defines a first field and a first design generation record that defines a first content item that is an image-type content item and that is associated with the first field. The field association data defines a first association between the first field and the first element. The method further includes generating a first synthesised design that is based on the selected design and that is generated such that the first element of the selected design is updated in the first synthesised design using the first content item.

18 Claims, 10 Drawing Sheets

(56) References Cited

U.S. PATENT DOCUMENTS

| | | | | |
|---|---|---|---|---|
| 2015/0339276 | A1* | 11/2015 | Bloem | G06T 11/203 715/234 |
| 2016/0294820 | A1* | 10/2016 | Douglas-Middleton | G06F 21/00 |
| 2021/0110105 | A1* | 4/2021 | Smajic | H04L 51/18 |
| 2021/0149611 | A1* | 5/2021 | Shinagawa | G06F 3/1208 |
| 2021/0326521 | A1* | 10/2021 | Kayastha | G06F 3/04817 |

OTHER PUBLICATIONS

Canvas Titans Chrome Extension for MASS Scaling Canva Designs Overview & Tutorial, https://www.youtube.com/watch?v=EZv95cOgIKQ, Upload date: Jul. 13, 2019, pp. 1-17.

Compass Academy Design Tool, Upload date: Nov. 10, 2020, Selected screenshots captured from the video uploaded on Nov. 10, 2020, pp. 1-4.

Data-driven design automation with Figma plugins, https://www.youtube.com/watch?v=NTuMIdvBonY, Upload date: Sep. 26, 2019, pp. 1-4.

Designing with Collection Lists—Webflow CMS tutorial, https://www.youtube.com/watch?v=CTysNgmxcG4, Upload date: Aug. 16, 2017, pp. 1-3.

Figma Plugins: Data lab, https://www.figma.com/community/plugin/740286071386014712/Data-Lab, Screenshots captured on Mar. 4, 2024, based on the screen recording captured before Feb. 8, 2022, pp. 1-4.

How to Do a Mail Merge in Microsoft Word, https://www.youtube.com/watch?v=9oeuE8nqliQ, Upload date: Mar. 25, 2016, pp. 1-2.

How to Use Data Merge in InDesign, https://www.youtube.com/watch?v=jhjF6U3nAgg, Upload date: Mar. 10, 2020, pp. 1-3.

Merch Titans Automation with all Major Print on Demand Platforms Running Simultaneously, https://www.youtube.com/watch?v=8Dy0EI2iGWY, Upload date: Mar. 21, 2019, pp. 1-9.

Variable data, text and images in Adobe Illustrator CC, https://www.youtube.com/watch?v=mpwXj2E7YNA, Upload date: Jan. 3, 2020, pp. 1-3.

Xpress docs, xpressdocs.com/next/mylisting_results.php, Screenshots captured on Mar. 4, 2024, based on the screen recording captured before Feb. 8, 2022, pp. 1-4.

"How to bulk generate designs using mail merge on canva," https://www.ilovefreesoftware.com/31/tutorial/how-to-bulk-generate-designs-using-mail-merge-on-canva.html (last visited Feb. 16, 2023), pp. 1-7.

Examination Report No. 1 for Australian application No. 2023201259 mailed May 30, 2023, pp. 1-7.

* cited by examiner

SYSTEMS AND METHODS FOR AUTOMATICALLY GENERATING DESIGNS

CROSS-REFERENCE TO RELATED APPLICATION

This application is a U.S. Non-Provisional application that claims priority to Australian Patent Application No. 2023201259, filed Mar. 1, 2023, which is hereby incorporated by reference in its entirety.

TECHNICAL FIELD

Aspects of the present disclosure are directed to systems and methods for automatically generating designs.

BACKGROUND

Various computer applications for creating and publishing graphic designs exist. Generally speaking, such applications allow users to create a design by, for example, creating a page and adding design elements to that page at particular positions.

SUMMARY

Described herein is a computer implemented method for generating a plurality of synthesised designs based on a selected design, the selected design including a first element, the computer implemented method including: accessing design generation data, the design generation data including source data and field association data, wherein: the source data defines a first field, a first design generation record, and a second design generation record, the first design generation record defining a first content item that is an image-type content item and that is associated with the first field, the second design generation record defining a second content item that is an image-type content item and that is associated with the first field; and the field association data defines a first association, the first association being an association between the first field and the first element; generating a first synthesised design, wherein the first synthesised design is based on the selected design and is generated such that the first element of the selected design is updated in the first synthesised design using the first content item; and generating a second synthesised design, wherein the second synthesised design is based on the selected design and is generated such that the first element of the selected design is updated in the second synthesised design using the second content item.

Figure 1:
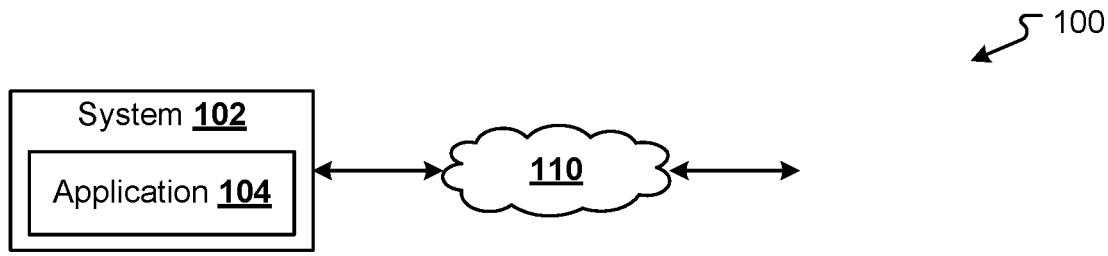
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is directed to systems and methods for generating designs.

Computer systems can assist users to create designs. Creating designs can be a time-consuming practice. In some situations a user may need to create a large number of designs which are substantially similar in their look and feel but contain different content. For example, an organisation may want to create similar looking business cards for all staff members but customise each card with the details of a different staff member—e.g. name, email, phone number, photograph, and/or other details. Creating such large number of individually tailored designs takes a substantial amount of time.

The present disclosure describes computer implemented techniques for automatically generating designs. Generally, the techniques described herein generate designs based on a selected design (which includes design elements) and design generation data. The design generation data includes one more design generation records that define content items. A design generation record is used to generate a new design that based on the selected design and the content items defined in the design generation record.

FIG. 1 depicts a computer processing system 102 that is configured to perform the various functions described herein. Computer processing system 102 may be any suitable type of computer processing system, for example a desktop computer, a laptop computer, a tablet device, a smartphone device, or an alternative computer processing system.

In this example, computer system 102 is configured to perform the functions described herein by execution of a software application 104—that is, instructions that are stored in a storage device (such as non-transitory memory 208 described below) that is accessible to the computer system 102 and executed by a processing unit of the system 102 (such as processing unit 202 described below).

Application 104 may take various forms. For example, application 104 may be a native/stand-alone graphic design application, a web browser application (such as Chrome, Internet Explorer, Edge, Safari or an alternative web browser application). In alternative embodiments, the functions described herein as being performed by application 104 may be performed by a module (e.g. an add-on or plug-in) that operates in conjunction with another application.

Further, while application 104 is depicted as running on a single computer processing system 102, it may be a distributed application in which the functionality is performed by multiple inter-operating applications that may execute on the same or different computer processing systems. As one example, application 104 may be a client application that communicates (via network 110) with a server application (not shown), and the functionality described herein is jointly performed by the client and server applications.

In the example of FIG. 1, system 102 is connected to a communications network 110. Via network 110, system 102 can communicate with (e.g., send data to and receive data from) other computer processing systems (not shown). While the present disclosure is described in the context of a stand-alone application (e.g. with application 104 performing all operations), the techniques described herein could be used (or be adapted to be used) in a client-server type environment—e.g. with a client application communicating with one or more server applications over a network such as 110 and relevant functions being performed by the interoperation of those applications.

In FIG. 1, system 102 is depicted as having/executing a single application 104. However, system 102 may (and typically will) include additional applications (not shown). For example, and assuming application 104 is not part of an operating system application, system 102 will include a separate operating system application (or group of applications).

Figure 2:
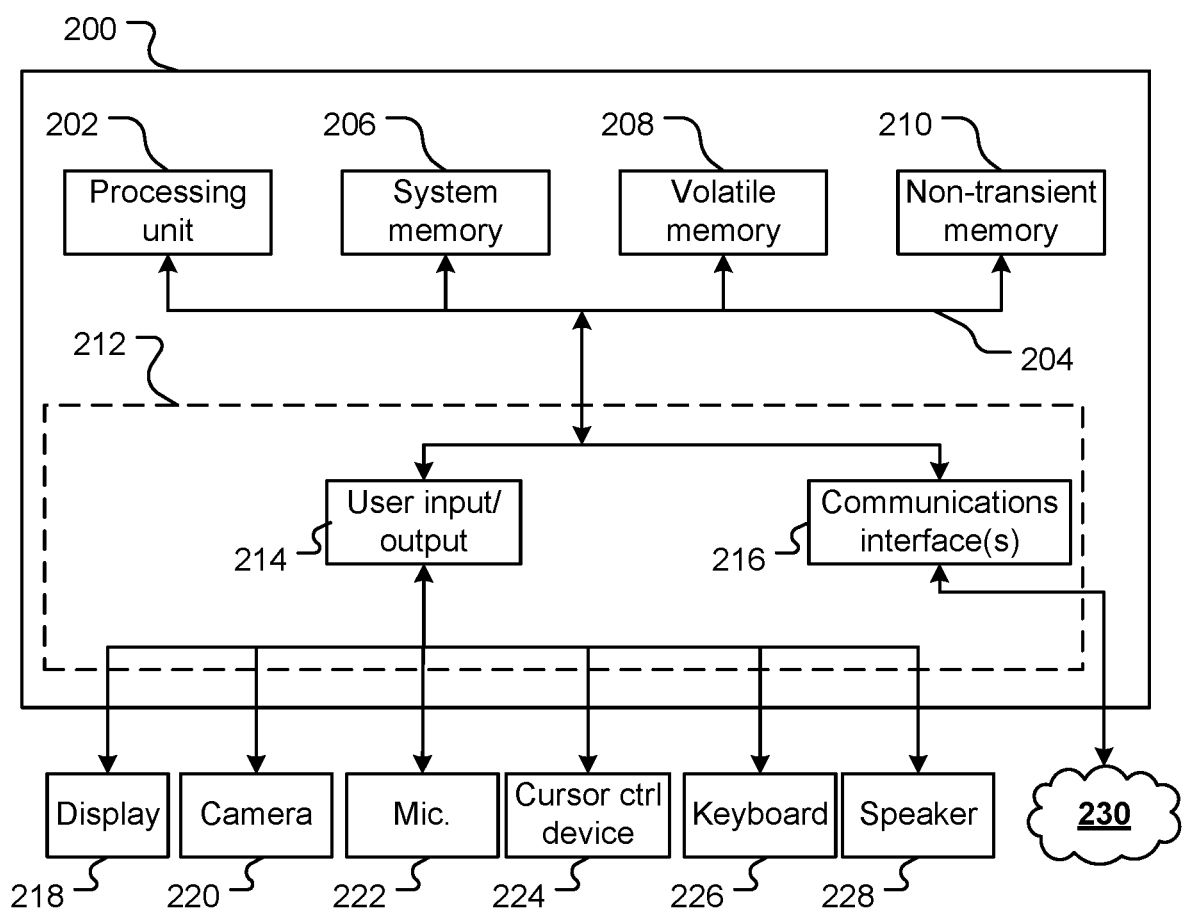
FIG. 2 is a block diagram of a computer processing system configurable to perform various features of the present disclosure.

Turning to FIG. 2, a block diagram depicting hardware component of a computer processing system 200 is provided. The computer processing system 102 of FIG. 1 may be a computer processing system such as 200 (though alternative hardware architectures are possible).

Computer processing system 200 includes at least one processing unit 202. The processing unit 202 may be a single computer processing device (e.g., a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage devices (also referred to as memory devices). Computer readable instructions and/or data which are executed by the processing unit 202 to control operation of the processing system 200 are stored on one or more such storage devices. In this example system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integrated with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 200 connects—whether by wired or wireless means—include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse (or other cursor control device), trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a personal computing device such as a desktop or laptop device, it may include a display 218 (which may be a touch screen display), a camera device 220, a microphone device 222 (which may be integrated with the camera device), a cursor control device 224 (e.g., a mouse, trackpad, or other cursor control device), a keyboard 226, and a speaker device 228.

As another example, where system 200 is a portable personal computing device such as a laptop computer, smart phone, or tablet, it may include a touchscreen display 218, a camera a camera device 220, a microphone device 222, and a speaker device 228.

Alternative types of computer processing systems, with additional/alternative input and output devices, are possible.

System 200 also includes one or more communications interfaces 216 for communication with a network, such as network 110 of FIG. 1. Via the communications interface(s) 216, system 200 can communicate data to and receive data from networked systems and/or devices.

System 200 stores or has access to computer applications (also referred to as software or programs)—i.e., computer readable instructions and data which, when executed by the processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, in FIG. 1 computer processing system 100 (which may be or include the hardware components of computer processing system 200) includes and executes application 104.

In some cases part or all of a given computer-implemented method will be performed by system 200 itself, while in other cases processing may be performed by other devices in data communication with system 200.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 3:
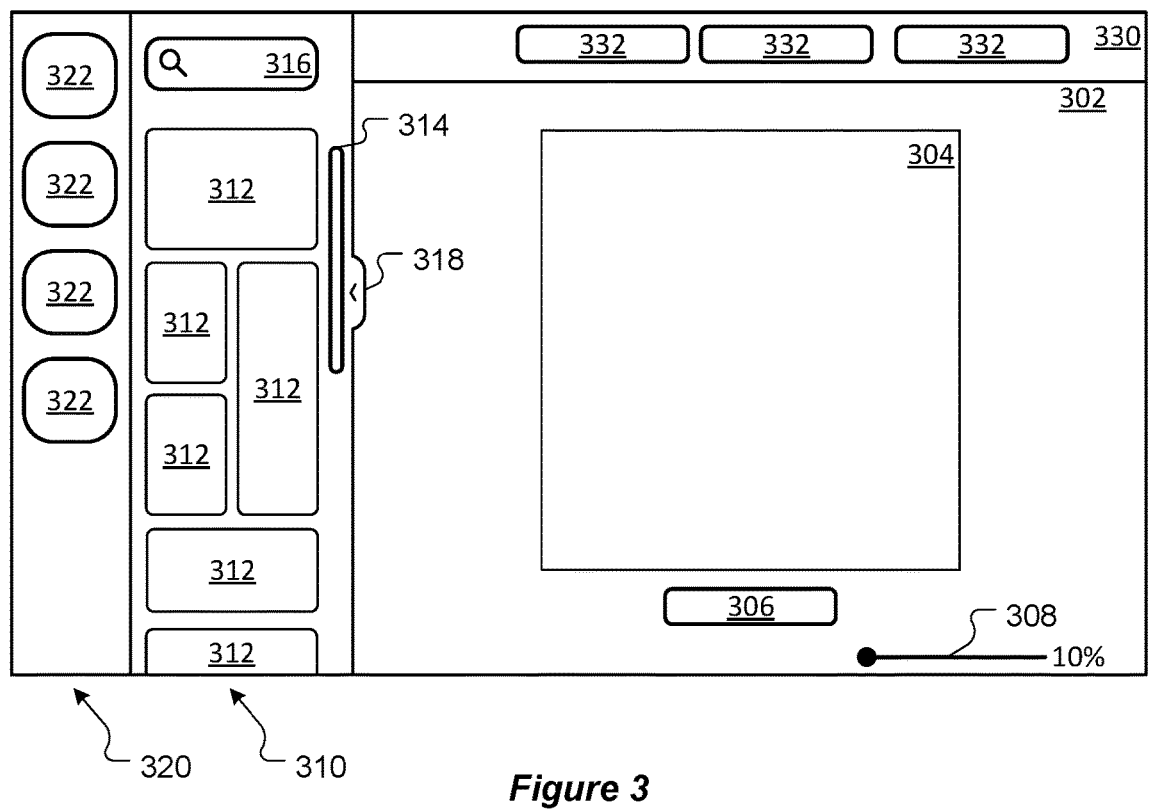
FIG. 3 depicts an example design creation graphical user interface.

In the present disclosure, the client application 104 configures the client system to provide a design creation user interface. Generally speaking, a design creation UI will allow a user to create, edit, and output designs. To illustrate the types of features that client application 104 may provide, FIG. 3 provides one example of a design creation user interface (UI) which, in this example, is a graphical user interface (GUI) 300. Alternative interfaces, with alternative layouts and/or providing alternative tools and functions, are possible.

GUI 300 includes a design preview area 302 on which a canvas 304 is shown. Canvas 304 is used to display a page (or, in some cases multiple pages) of a design that is being created. In this example an add page control 306 is provided (which, if activated by a user, causes a new page to be added to the design being created) and a zoom control 308 (which a user can interact with to zoom into/out of page currently displayed by canvas 304).

GUI 300 also includes an asset preview area 310. Asset preview area 310 displays previews 312 of assets that are made available to users to assist in creating designs. Different types of assets may be made available, for example design elements (of varying types, e.g., raster images, vector graphics, shapes, videos, audio clips, and/or other design element), design styles (e.g. defined sets of colours, font types, and/or other assets/asset parameters), and/or other assets that a user may use when creating their design. For example, a preview 312 may be of a design element (e.g., a raster graphic, a vector graphic, a video, an audio track, or an alternative element) and a user may add that design element to the design being created by dragging and dropping the preview 312 onto the canvas 304. Design elements may be added to a design in other ways. In this example, the preview area 310 displays a scroll control 314 allowing a user to scroll through previews 312. Scroll control 314 may be hidden when user focus is not in the preview area 310.

Preview area 310 also includes a search control 316 via which a user can submit search data (e.g., a string of characters) to search for particular design assets. Previews 312 of the search results returned are then displayed in the preview area 310. In this example, a hide preview area control 318 is provided, which can be activated to hide the asset preview area 310 (serving to enlarge the design preview area 302).

Depending on implementation, the previews 312 displayed in asset preview area 310 (and the design assets corresponding to those previews) may be accessed from various locations. For example, the search functionality invoked by search control 316 may cause application 104 to search for assets that are stored in locally accessible memory of the system 102 on which application 104 executes (e.g., non-transitory memory such as 210 or other locally accessible memory), assets that are stored at a remote server (and accessed via a server application running thereon), and/or assets stored on other locally or remotely accessible devices.

GUI 300 also includes a type selection area 320 which displays a plurality of type selection controls 322. The type selection controls 322 may be activated by a user to select a type of design asset for which previews 312 are displayed (and can be searched for) in preview area 310. By way of example, type selection controls 322 may be provided for types such as photos (e.g., raster graphics), vector graphics, text, audio, video, styles, colour palettes, and/or other types.

GUI 300 also includes an additional controls area 330 for displaying additional controls 332. The additional controls 332 may include permanent controls (e.g., controls such as save, download, print, share, publish, and/or other controls that are frequently used/widely applicable and that application 104 is configured to permanently display); user configurable controls (which a user can select to add to or remove from area 330), and/or adaptive controls (which may automatically change depending on the type of design element that is currently selected/being interacted with by a user). For example, if a text element is selected, adaptive controls such as font style, type, size, position/justification, and/or other font related controls may be displayed. Alternatively, if a vector graphic element is selected, adaptive controls such as fill attributes, line attributes, transparency, and/or other vector graphic related controls may be displayed.

Once created, a user may output a design in various ways. For example, application 104 may provide a user with options to output a design by one or more of: saving the design to local memory of system 102 (e.g. non-transitory memory 210); saving the design to a networked computer system or data store (e.g. via network 110); printing the design to a printer (local or networked); communicating the design to another user (e.g., by email, instant message, or other electronic communication channel); publishing the design to a social media platform or other service (e.g., by sending the design to a third party server system with appropriate API commands to publish the design); and/or by other output means.

Data in respect of designs that have been (or are being) created may be stored in various formats. An example design data format that will be used throughout this disclosure for illustrative purposes will now be described. Alternative design data formats (which make use of the same or alternative design attributes) are, however, possible, and the processing described herein can be adapted for alternative formats.

In the present context, data in respect of a particular design is stored in a design record. Generally speaking, a design record defines certain design-level attributes and includes page data.

A design's page data defines (or references) one or more page records. Each page record defines a page of the design via one or more page-level attributes and element data.

In the present example, the format of each design record is a device independent format comprising a set of key-value pairs (e.g. a map or dictionary). To assist with understanding, a partial example of a design record format is as follows:

| Attribute | Example |
| --- | --- |
| Design ID | "designId": "abc123" |
| Dimensions | "dimensions": {"width": 1080, "height": 1080} |
| Design type | "type": "poster" |
| Design name | "name": "Test Doc 3" |
| Design owner | "owner": 12ab34cd |
| Edit time | "edited": "xxx" |
| Page data | "pages": [{page 1}, ... {page n}] |

In this example, the design-level attributes include: a design identifier (which uniquely identifies the design); page dimensions (e.g. a default page width and height); a design type (e.g. an indicator of the type of the design, which may be used for searching and/or sorting purposes); a design name (e.g. a string defining a default or user specified name for the design); a design owner (e.g. an identifier of a user or group that owns or created the design); a most recent edit time (e.g. a timestamp indicating when the design was last edited); and page data (discussed below). Additional and/or alternative design-level attributes may be provided, such as attributes regarding creation date, design version, design permissions, and/or other design-level attributes.

In this example, a design record's page data is a set (in this example an array) of page records, each of which defines page data in respect of a page of the design. In this example, a page record's position in a design's page array serves to identify the page and also determines its position in the design (e.g. a page at array index n appears after a page at array index n−1 and before a page at array index n+1). Page order may be alternatively handled, however, for example, by storing page order as an explicit attribute.

To assist with understanding, a partial example of a design record format is as follows:

| Attribute | Example |
| --- | --- |
| Dimensions | "dimensions": {"width": 1080, "height": 1080} |
| Background | "background": {"assetID": "M12345"} |
| Element data | "elements": [{element 1}, ... {element n}] |

In this example, the page-level attributes include: dimensions (e.g. a page width and height which, if present, override the default page dimensions defined by the design level dimensions attribute described above); background (data indicating any page background that has been set, for example an asset identifier of an image that has been set as the page background, a value indicating a particular colour of a solid background fill, or data indicating an alternative background); and element data (discussed below). Additional and/or alternative page-level attributes may be provided, such as attributes regarding creation date, design version, design permissions, and/or other design-level attributes.

In this example, a design page's element data is a set (in this example an array) of element records. Each element record defines an element (or a set of grouped elements) that has been added to the page. In this example, an element record's position in a page's elements array serves to identify the element and also determines the depth or z-index of the element (or element group) on the page (e.g. an element at array index n is positioned above an element at array index n−1 and below an element at array index n+1). Element depth may be alternatively handled, however, for example, by storing depth as an explicit element attribute.

Generally speaking, an element record defines an object that has been added to a page—e.g. by copying and pasting, importing from one or more asset libraries (e.g. libraries of images, animations, videos, etc.), drawing/creating using one or more design tools (e.g. a text tool, a line tool, a rectangle tool, an ellipse tool, a curve tool, a freehand tool, and/or other design tools), or by otherwise being added to a design page.

Different types of design elements may be provided for depending on the system in question. By way of example, design element types such as the following may be provided: graphic elements; video elements; audio elements; text elements; and/or elements of other types.

As will be appreciated, different attributes may be relevant to different element types. For example, any element that holds visual content (e.g. an image, video, text, etc.) will typically be associated with position and size data, while such data may not be relevant to an element that holds audio media. Accordingly, different element record formats (with different attributes) may be used for different element types.

By way of example, an element record for an image type element may be as follows:

| Attribute | Note | E.g. |
| --- | --- | --- |
| Type | A value defining the type of the element. | "type": "IMAGE" |
| Position | Data defining the position of the element: e.g. an (x, y) coordinate pair defining (for example) the top left point of the element. | "position": (100, 100) |
| Size | Data defining the size of the element: e.g. a (width, height) pair. | "size": (500, 400) |
| Rotation | Data defining any rotation of the element. | "rotation": 0 |
| Opacity | Data defining any opacity of the element (or element group). | "opacity": 1 |
| Asset identifier | Data indicating the asset (e.g. an image) that the element holds/is used to display | "assetID": "M12345" |

In the present embodiments, an image-type element is used to hold an image-type content item. An image-type content item may, for example, be a raster image (such as a digital photograph, rendering, or an alternative raster image) or a vector graphic image.

As a further example, an element record for a text type element may be as follows:

| Key/field | Note | E.g. |
|---|---|---|
| Type | A value defining the type of the element. | "type": "TEXT", |
| Position | Data defining the position of the element. | "position": (100, 100) |
| Size | Data defining the size of the element. | "size": (500, 400) |
| Rotation | Data defining any rotation of the element. | "rotation": 0 |
| Opacity | Data defining any opacity of the element. | "opacity": 1 |
| Text | Data defining the actual text characters | "text": "Trip" |
| Attributes | Data defining attributes of the text (e.g. font, font size, font style, font colour, character spacing, line spacing, justification, and/or any other relevant attributes) | "attributes": {...} |

As described above, application 104 may provide a drag-and-drop interface for adding design elements to a design. To illustrate this, consider a user who wishes to add an image to a design they are creating. In this case, the user may search for an image via search control 316. In response, image assets matching the search criteria are identified and previews 312 of those image assets are displayed. A user may then drag a particular preview 312 and drop it onto the canvas 304 (the canvas providing a view of a particular page of a particular design) at a particular position. In response, an element record is generated (including, for example, position data based on where the asset was dropped and an asset identifier that identifies the asset that has been dropped on the canvas 304 to create the element). The element record is then added to the relevant page's elements array (e.g. by appending it to the end of the array).

In the example design format described above, visual design elements (such as text elements, image elements, video elements, and/or other visual elements) that are added to or included in a design have a defined position. In the above examples, an element's position is defined by an (x,y) coordinate pair. While a design element can be moved (by changing its position), design elements do not move automatically when other elements are added to or removed from the design. This may be contrasted with other document formats in which the position of document content is not defined in this way. For example, in a typical word processing document format content is generally positioned relatively to other content—that is, content that is initially at a particular position may move up or down a page as other content is added to or deleted from the document. While the techniques described here can be used (or be adapted to be used) with document formats that do not explicitly describe content positions, the embodiments described are with respect to a format in which visual elements are associated with a defined position (such as a (x,y) coordinate pair).

The techniques described herein involve generating and using what is referred to as design generation data. As used herein, design generation data is data that is used by application 104 (in conjunction with a selected design) to generate new designs.

In the present embodiments, design generation data includes source data and field association data.

In the present embodiments, the source data defines a set of one or more fields and a set of one or more design generation records.

Each field is associated with a field name (which may be a default or user-defined name) and a field type. Each field has a unique identifier, which may be the field name (provided it is unique) or may be a unique identifier automatically generated by application 104 for the field.

Each design generation record includes a set of content items. The set of content items includes a content item corresponding to each field in the set of fields. A given content item defines content that has the same type as the type of the field that content item corresponds to. E.g. a content item corresponding to a text-type field defines text content, while a content item corresponding to an image-type field defines image content.

Application 104 may store source data in any appropriate format. By way of illustration, source data can be conveniently expressed in a table-type format. One example of this is below:

| ("Field A":"Text") | ("Field B":"Text") | ("Field C":"Image") |
|---|---|---|
| "A1" | "B1" | "C1" |
| "A2" | "B2" | "C2" |

In this example, each column defines a field and the header of each column provides the field name (which, in this case, also serves as the field identifier) and field type. In this example three fields are defined: text-type Field A, text-type Field B, and image-type Field C. Each row of the table (except the top row) defines a design generation record. For example, the second row of the table defines a first design generation record that includes content items A1 (associated with Field A), B1 (associated with Field B), and C1 (associated with Field C), and the third row of the table defines a second design generation record that includes content items A2, B2, and C2. Each content item may define actual content (e.g., actual text in the case of a text-type content item) or provide a reference to where content may be located (e.g., a file path, URL, link, or other reference to a file that includes content of the appropriate type (e.g. text, image, audio, or video, or other types of content).

In the present embodiments, the field association data describes associations between fields (as defined by the source data) and design elements of a selected design. The field association data may include a set of field association records, each field association record identifying a particular field and a particular design element. An element of a selected design may be identified in any appropriate way. As one example, and in the context of the design data format described above, a design element may be identified by a (page index, element index) tuple (where page index is the position of the relevant page record in the designs page's array, and element index is the position of the relevant element in the page's element array).

Any appropriate data format may be used to store field association data (and field association records). As one example, each field association record may be a tuple such as the following:

| |
|---|
| ("Field A", (0,0)) |
| ("Field B", (0,3)) |
| ("Field C", (1,2)) |

In this example, the field identified by "Field A" is associated with the first design element (i.e. the element defined by the element record at element array index 0) of the first page (i.e. the page defined by the page record at page array index 0) of a selected design.

In the present embodiments, an element of a selected design that has been associated with a field may be referred to as a container element.

As described in detail below, in order to generate designs application 104 generates a new design (referred to as a synthesised design) corresponding to each design generation record that is defined in the source data. With the example source data and field association data described above, application 104 will generate a first synthesised design that is based on the selected design and the first design generation record. In the first design: element (0,0) of the selected design is updated based on content item A1; element (0,3) of the selected design is updated based on content item B1; and element (1,2) of the selected design is updated based on content item C1. Application 104 will also generate a second synthesised design that is based on the selected design and the second design generation record. In the second design: element (0,0) of the selected design is updated based on content item A2, element (0,3) of the selected design is updated based on content item B2; and element (1,2) of the selected design is updated based on content item C2.

To assist in understanding the present disclosure, example user interfaces that application 104 may be configured to display (and receive user input through) will be described with reference to FIGS. 4 to 9 and two example synthesised designs will be described with reference to FIG. 10. Following this, operations that application 104 may be configured to perform to generate designs will be described with reference to FIGS. 11 to 14.

Figure 8:
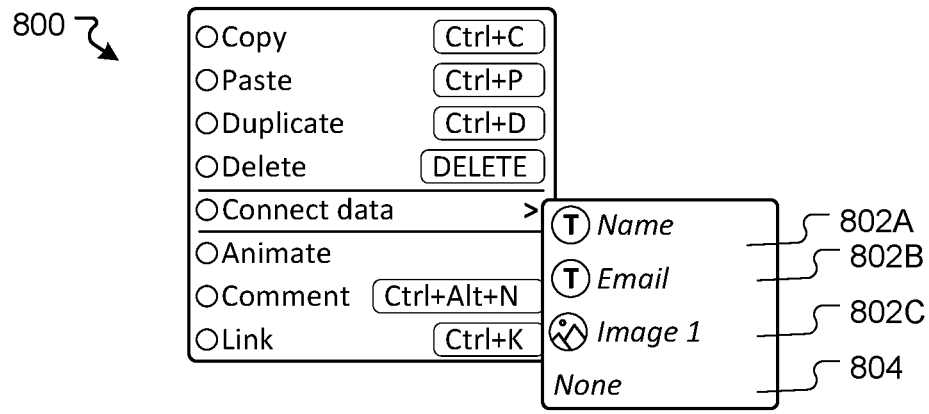
Figure 9:
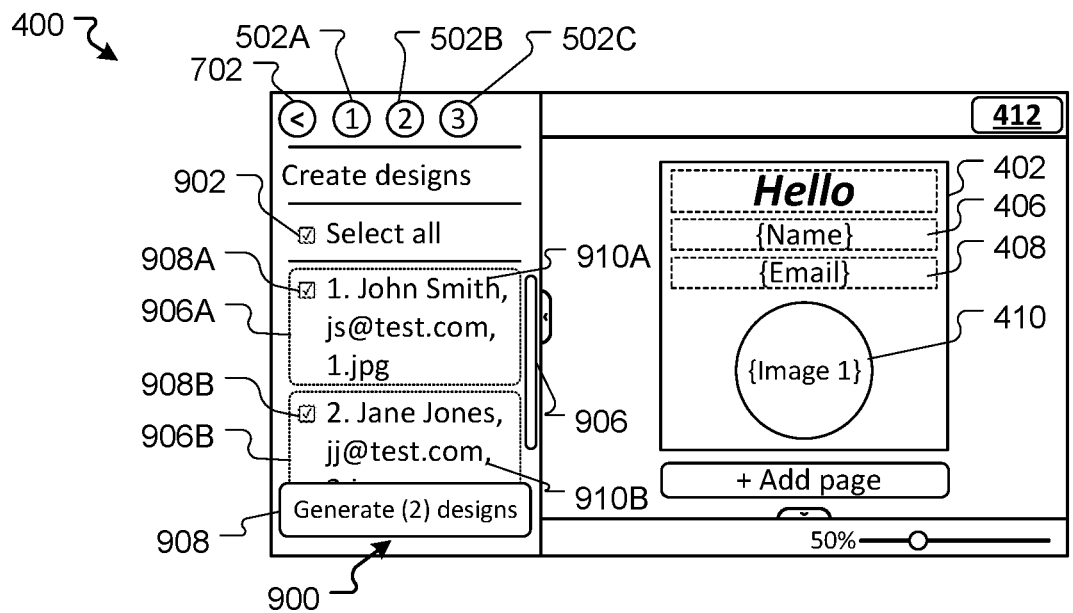

Generally speaking, the user interfaces described herein facilitate progress through a design generation workflow which includes the high level phases of: initiating a design generation process (see FIG. 4); selecting a data source for source data (see FIG. 5); defining, editing, and/or confirming source data (see FIG. 6); associating fields with selected design elements (see FIGS. 7A-7C and 8); and confirming design creation (see FIG. 9).

Figure 4:
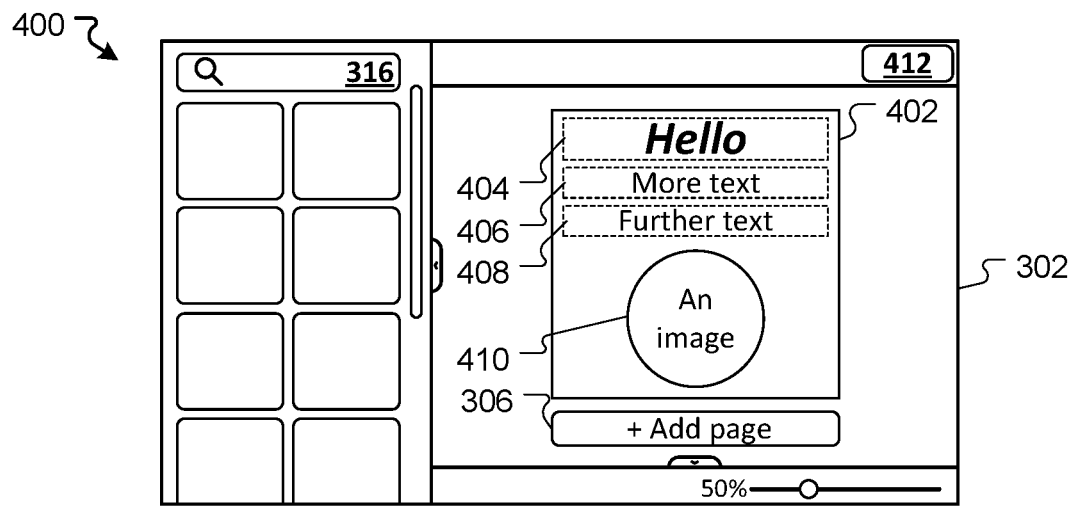
FIG. 4 depicts an example design within an example design creation graphical user interface.

FIG. 4 provides an example design creation UI 400 including an example design 402. Design 402 includes four design elements, each of which is indicated by a UI object: three text elements indicated by UI objects 404, 406, and 408 and an image element indicated by UI object 410. Design creation UI further includes an initiate design generation control 412, and an add page control 306. In this example, design creation UI 400 is the same design creation UI 300 described above (excepting the asset selection area 320 of UI 300 is not shown). Other UI elements included in UI 400 are not labelled and are similar to those described in relation to UI 300.

In this example, design creation UI 400 displays an example design 402. While design 402 contains one design page, it will be appreciated that additional design pages could be added using add page control 306.

Initiate design generation control 412 may be used for initiating the process of generating new designs, which is described with reference to FIG. 5.

Figure 5:
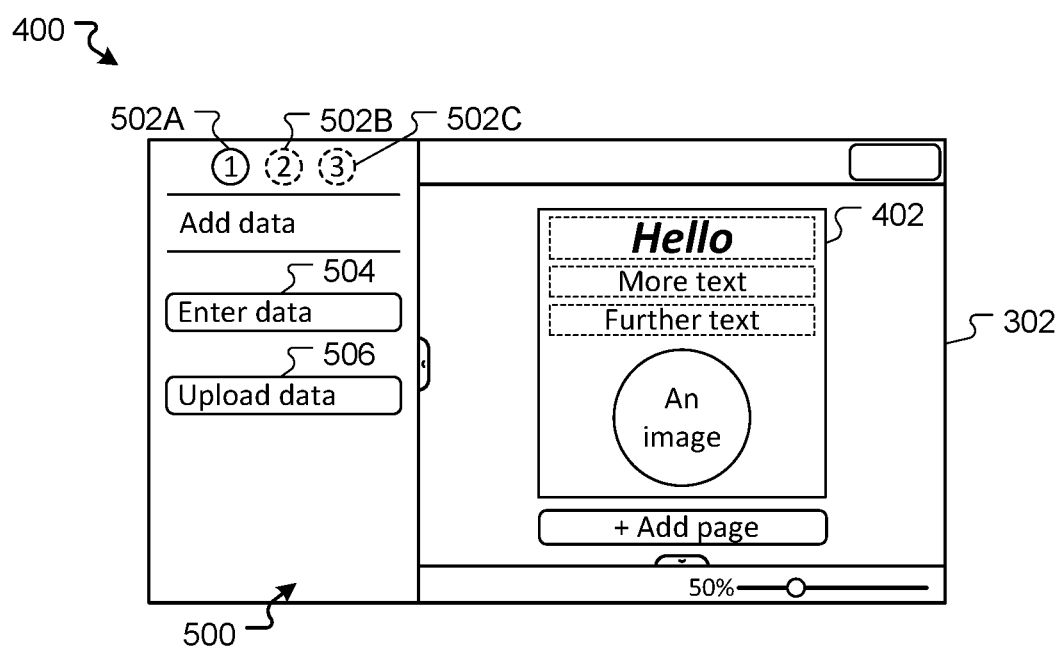
FIG. 5 depicts an example data source selection graphical user interface.

FIG. 5 depicts an example data source selection UI 500. In this example, the data source selection UI 500 is displayed as a pane within the example design creation UI 400 (described above with reference to FIG. 4)—in particular, the data source selection UI 500 has replaced the asset preview area 310 depicted in FIG. 3. Application 104 may, for example, display the data source selection UI 500 in response to a user initiating an automatic design creation process (e.g. by activation of a control such as 412 described above with reference to FIG. 4).

In the present example, the data source selection UI 500 includes workflow indicators 502, an enter data control 504, and an upload data control 506.

Workflow indicators 502 inform a user of the general workflow involved in generating new designs and a current position in that workflow. In this embodiment, the workflow is shown to include three major steps and, correspondingly, three workflow indicators are shown (i.e., 502A, 502B, and 502C). In UI 500, indicator 502A is shown in an active state whereas indicators 502B and 502C are shown in an inactive state, which indicates that the current workflow step is the first step of three steps.

Controls 504 and 506 enable a user to specify how they would like to define the source data that will, in due course, be used by application 104 to generate new designs. This is described further below. In this example, a user may choose to either manually define source data (e.g., by selecting the enter data control 504) or to upload source data from a file that already defines (or partially defines) source data (e.g. by selecting the upload data control 506).

In response to detecting activation of the enter data control 504, application 104 displays a data entry UI, an example of which is described below with reference to FIG. 6.

In response detecting activation of the upload data control 506, application 104 may display a file selection UI (not shown) that enables the user to search or browse for, and select, a file that defines (or partially defines) source data. In the present embodiments, once a user has selected a file, application 104 retrieves relevant data from the file and displays this in a data editor UI so a user can review and, if desired, edit the data. An example data entry UI is described below with reference to FIG. 6.

Where a user is selecting a file to upload data from, application 104 may be configured to perform one or more checks on a selected file to ensure it contains appropriately formatted data. For example, application 104 may be configured to only accept files of certain defined formats such as spreadsheet or CSV files. In this case, application 104 will not permit a user to select a file that is not in an appropriate format and may instead generate an error or warning message indicating to the user that an appropriately formatted file must be selected.

Figure 6:
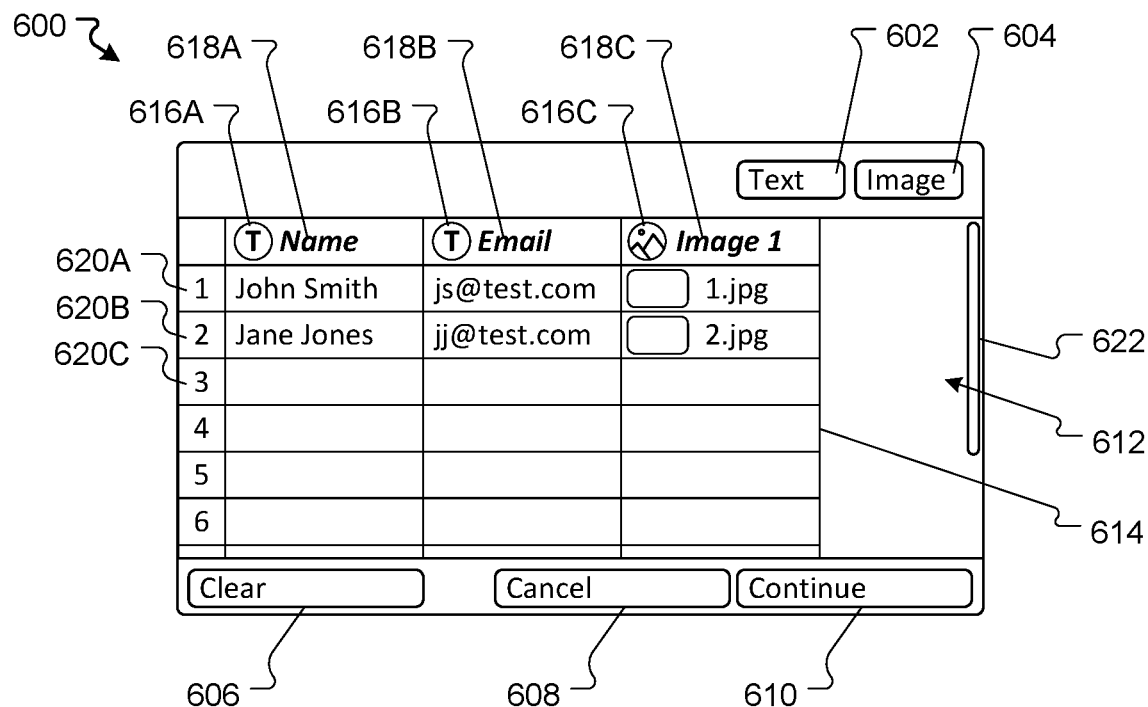
FIGS. 6 to 9 depict example graphical user interfaces.

Turning to FIG. 6, an example data editor UI 600 is shown. The data editor UI 600 may, for example, be a pop-up window that is displayed atop UI 400 of FIG. 5 in response to a user selecting the enter data control 504, or in response to a user selecting the upload data control 506 and selecting a valid file to upload data from.

In the present example, data editor UI 600 includes an add text field control 602, an add image field control 604, a clear control 606, a cancel control 608, and a continue control

610. Additional add field controls that are associated with other field types may be displayed, such as an add audio field control, and add video field control, and/or other add field controls associated with alternative types.

Data editor UI 600 also includes a data entry and preview region 612.

In the present embodiment, the data entry and preview region includes a table 614. Each column of table 614 corresponds to a field and includes a header cell (in the topmost table row). In this example, each header cell includes a field type indicator 616 (which indicates a type of the field) and a field name label 618 (which shows the field name). In the example of FIG. 6, indicators 616A and 616B show that the columns labelled "Name" and "Email" represent text-type fields and indicator 616C shows that the column labelled "Image 1" represents an image-type field.

Each cell of table 614 (except the cells of the header row which define fields) can be used to define a content item. The type of content item that a cell can be used to define is dictated by the type of the field that defines the column that cell is in. For example, a cell in the "Name" column (which defines a text-type field) can only be used to define a text-type content item. Conversely, a cell in the "Image 1" column (which defines an image-type field) can only be used to define an image-type content item). A user may interact with a header row cell to edit the field name and/or field type.

Each table row 620 (excepting the header row) can be used to define a design generation record. In the example shown in FIG. 6, table 614 defines two design generation records (corresponding to rows 620A and 620B), each of which defines two text-type content items (in the "Name" and "Email" columns) and one image-type content item (in the "Image 1" column).

Where data editor UI 600 is displayed in response to a user activating the enter data control 504, table 614 may be initially displayed without any fields (e.g., columns) or design generation records. Alternatively, where data editor UI 600 is displayed in response to a user activating the enter data control 504, table 614 may be initially displayed with one or more default fields (e.g., columns) which a user may then delete, edit, or add to. Where data editor UI 600 is displayed in response to a user activating the upload data control 506, table 614 will include columns and rows based on the data retrieved from a file selected by the user.

The add text field control 602 and add image field control 604 enable a user to define new fields (which, in the present example, are represented as columns of data in table 614). A user may also associate a name label (similar to labels 618) with each field. In the present example, once each field is added, it will be displayed as a separate column inside data preview pane 612 (e.g., similar to existing columns labelled "Name", "Email", and "Image 1"). Application 104 may automatically generate and provide a default name label 618 for any new field created (e.g. "Text 1"), however, a user may interact with the header cell of the new column to edit the default name label 618.

While the present example only defines controls for adding text- and image-type fields, controls for adding additional (or alternative) types of fields may be provided. For example, application 104 may be configured to permit audio-, video-, and/or other types of fields (and to provide relevant user interface controls for defining fields of such types).

By interacting with cells of the table 614 (excepting cells of the header row), a user may add or modify content items. For example, a user may select a cell to edit by clicking or otherwise interacting with that cell.

In this example, in response to detecting user interaction with a cell corresponding to a text-type field, application 104 displays a text editor to receive user input that defines the text of a text-type content item. In response to detecting user interaction with a cell corresponding to an image-type field, application 104 displays a file selection interface assisting the user in locating and selecting a new image file. If an image file had been previously selected, selecting a new file will cause application 104 to replace the previously selected file. On selection of a file, application 104 may display that file's name in the cell and may also display a thumbnail of the selected file's image.

In order to add a new design generation records, a user may select a cell in the next (or any) unpopulated row (e.g., in the current example, row 620C) and define a content item for that cell as described above. In this example, a vertical scroll control 622 is displayed which enables a user to scroll up or down the data shown in data preview pane 612 as necessary. In this example, all columns representing fields are visible in preview pane 612. In the event that source data contains more fields, application 104 may display a horizontal scroll control (not shown) to enable a user to horizontally scroll the view to be able to see all fields (represented by columns in table 614).

In response to detecting activation of the clear control 606, application 104 clears all the data displayed in table 614 (and, all fields and design generation records).

In response to detecting activation of the cancel control 608, application 104 may clear all data and additionally close the data selection UI 600. In this case, application 104 may redisplay the data source selection UI 500 (or an alternative UI).

In response to detecting activation of continue control 610, application 104 finalises source data according to the content of table 614. That is, each column of table 614 defines a field of the source data and each row of table 614 (and the content items defined the cell(s) of that row) defines a design generation record. Continuing with the table-format example for source data described above, source data corresponding to the content of table 614 may (as one example) be represented as follows:

| ("Name":"Text") | ("Email":"Text") | ("Image 1":"Image"") |
|---|---|---|
| "John Smith" | "js@test.com" | "<file path>/1.jpg" |
| "Jane Jones" | "j'j@test.com" | "<file path>/2.jpg" |

In the present embodiments, in response to a user activating the continue control 610 application 104 closes (i.e., ceases displaying) the data editor UI 600 and displays a field association UI which a user can interact with to associate each field that has been defined with a template element. This is described in relation to FIGS. 7A, 7B and 7C below.

Figure 7A:
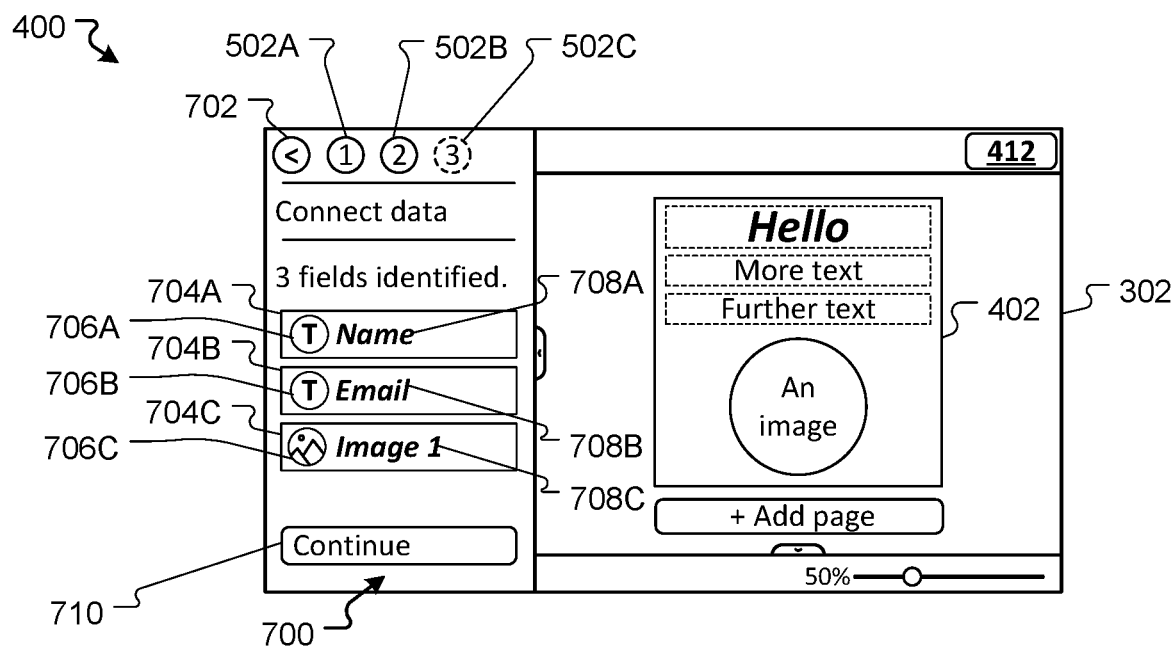

FIG. 7A provides one example of a field association UI 700. In this example, field association UI 700 is displayed in the editor UI 400 in place of the data source selection UI 500 as described above.

In the present example, field association UI 700 includes workflow indicators 502, a workflow backstep control 702, field indicators 704, and a continue control 710.

Workflow indicators 502 are similar to the workflow indicators previously described in relation to UI 500. In UI 700, indicators 502A and 502B are shown in active state whereas indicator 502C is shown in inactive state, which indicate that current workflow step is the second step of three steps.

In response to activation of the workflow backstep control 702, application 104 may cease displaying the container association UI 700 and re-display the data source selection UI 500 as described above. This allows the user to redefine the design generation records and/or the containers.

Application 104 also displays one or more field indicators 704 in the field association UI 700. Each field indicator 704 corresponds to a field that is defined in the source data. In this example, which continues from the example described above with reference to FIG. 6, three fields have been defined and, therefore, three field indicators are displayed (704A-704C). These are the fields that are available to a user for association with elements of a selected design (e.g. the design displayed in the design preview area 302).

In the present example, each field indicator 704 includes a field type indicator 706 and a field name label 708. The field type indicator 706 indicates the type of the field and, therefore, the type of design element that the field can be associated with. The field name label 708 provides the name that has been assigned to the field in the source data.

Via the field association UI 700 a user may associate fields (as defined by the source data) with template elements. Such association may be done in various ways, e.g., by using a drag and drop mechanism, or through a context menu (described below in relation to FIG. 8) or other user interaction.

By way of example, a user may drag a particular field indicator (e.g. 704A) and drop it on (or proximate to) a particular design element (e.g. 406). In response to detecting such a user interaction, application 104 records an association between the field indicated by the field indicator 704 in question and the design element that the field indicator 704 is dropped on (or near). Application 104 may record the association in field association data.

Alternative methods of creating an association between a field and a design element are possible. For example, application 104 may be configured to detect a particular user interaction with a design element (e.g. by a right-click, a dwell contact, or an alternative interaction) and, in response display a context menu enabling the user to create an association between that element and a field. This method is further described in relation to FIG. 8 below.

A particular design element may only be associated with a field if the type of the design element is compatible with the type of the particular field. In this particular example, the field corresponding to field indicator 704A can be associated with design element 406 because they both are associated with text-type content. However, the field associated with field indicator 704A cannot be associated with design element 410 (which is associated with image-type content) as their types do not match.

Figure 7B:
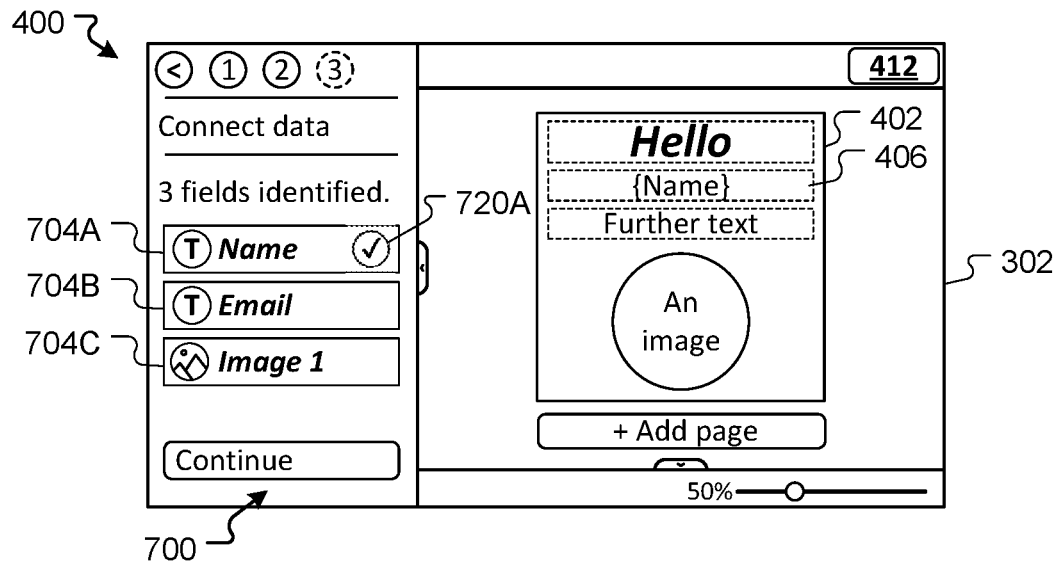
Figure 7C:
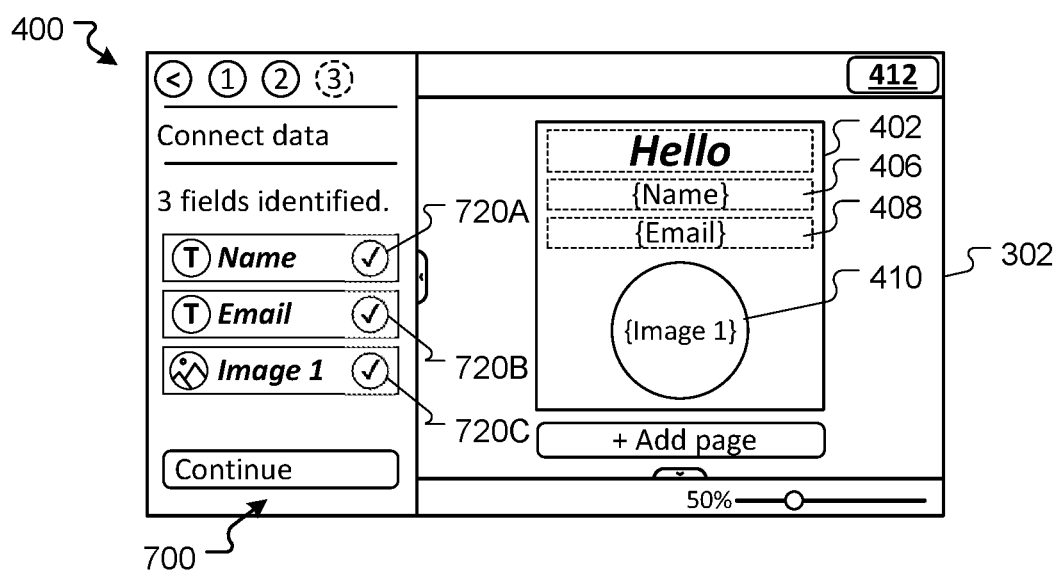

In the present embodiments, application 104 is configured to visually indicate when a field has been associated with a design element and when a design element has been associated with a field. FIGS. 7B and 7C provide examples of this.

In FIG. 7B, the "Name" field represented by field indicator 704A is associated with design element 406. Application 104 visually indicates this association by updating display of both the field indicator 704A and the design element 406. In this example, the field indicator 704A is updated with an association indicator 720 (here a 'tick' symbol) and the design element 406 is updated to display the text "{Name}" (indicating that this element is associated with the field labelled "Name" (i.e., represented by field bar 704A).

As a user specifies additional associations between fields and design elements, design 402 and pane 700 are progressively updated. FIG. 7C provides an example in which all defined fields are associated with a design element. In this example, fields "Name", "Email" and "Image 1" represented by field indicators 704A, 704B, and 704C are respectively associated with design elements 406, 408, and 410.

In other embodiments, other visual indicators may be used to display an association between a field and a design element. Examples of such visual indicators may include alternative graphics, text labels, symbols, colours, highlighting and/or a combination thereof.

Application 104 may be configured to provide additional (or alternative) means of associating fields with design elements. One such alternative means is via context menus. FIG. 8 shows an example context menu 800 which application 104 may display in response to a defined user interaction—e.g., a right-click on a particular design element. In this example, context menu 800 includes a "connect data" sub menu which, when selected, includes menu items 802 corresponding to the fields defined by the source data as well as "none" menu item 804. In response to selecting a menu item 802 corresponding to a particular field, application 104 creates an association between the particular element and that particular field. In response to selecting the "none" menu item 804, application 104 removes or deletes any existing association between the particular element and any field.

Application 104 may be configured to record associations between design elements and fields in any appropriate way. Continuing with the table-format example for field association data described above, field associations corresponding to the UI depicted in FIG. 7C may be represented as follows:

("Name", (0,1))
("Email", (0,2))
("Image 1", (0,3))

Once a user has finished associating fields with elements, continue control 710 may be activated to progress the workflow to the next stage.

Turning to FIG. 9, an example generate synthesised design UI 900 is shown. In this example, generate synthesised design UI 900 is displayed in the editor UI 400 in place of the field association UI 700 as described above. Application 104 may, for example, display UI 900 in response to detecting the activation of continue control 710.

In this example, UI 900 includes workflow indicators 502, a workflow backstep control 702, a select all control 902, a vertical scroll control 906, and a generate designs control 908.

Workflow indicators 502 are similar to the indicators previously described in relation to UIs 500 and 700. In UI 900, all indicators 502 are shown in active state, which indicates that the current workflow step is the third step of three steps.

Workflow backstep control 702 may be used to return to the previous step of the workflow. For example, in this case control 702 may cause application 104 to cease displaying UI 900 and display UI 700 as described above, which would allow the user to make further modifications to the associations between fields and design elements.

Select all control 902 enables a user to select/deselect all design indicators 906 (described below) at once. In this example, select all control 902 is displayed as a checkbox though alternative controls may be used.

Where necessary, vertical scroll control 906 enables a user to scroll the list of design indicators 906 that are displayed in pane 900.

UI 900 further includes one or more design indicators 906. Each design indicator 906 corresponds to a design generation record defined by the source data and, therefore, indicates a design that the user can choose to generate or not. In this example, two design indicators 906A and 906B are shown, which correspond to the two example design generation records described above with reference to table 614 of FIG. 6.

In this example, each design indicator 906 includes a selection control 908 and a design description 910 that is based on the design generation record that the indicator 906 corresponds to. A user may interact with a selection control 908 of a particular design indicator 906 and, in response, application 104 may select/deselect the design generation record that the particular design indicator 906 corresponds to. For example, a user may interact with selection control 908A (e.g., by left-clicking on or contacting the control) and in response application 104 may change the selection status of the design generation record represented by design indicator 906A.

In response to detecting the activation of generate designs control 908, application 104 generates a synthesised design corresponding to each design generation record that has been selected.

Figure 10:
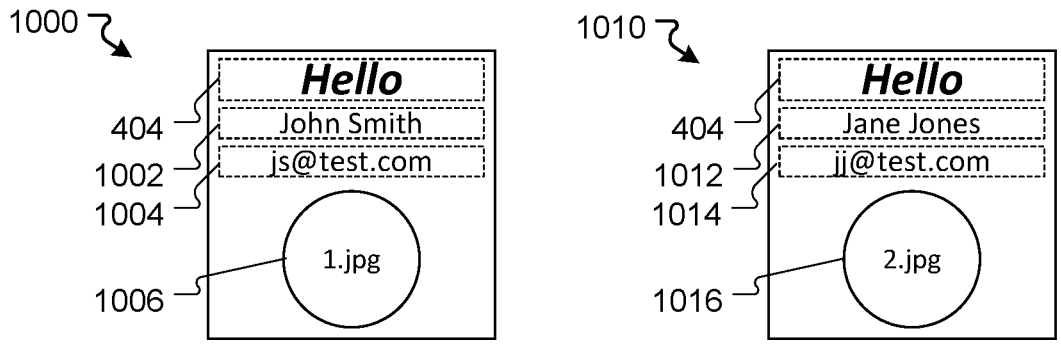
FIG. 10 depicts two example synthesised designs.

FIG. 10 provides examples of two synthesised designs 1000 and 1010. Designs 1000 and 1010 correspond to design 402 and are generated based on the example design generation records and field association data described above. Application 104 may generate designs 1000 and 1010 in response to a user interacting with generate designs control 908 of UI 900.

In synthesised design 1000, element 404 is the same as it was in the original design and without modification. This is because element 404 was not was not associated with any field. Other elements of synthesised design 1000 (i.e., elements 1002, 1004, and 1006) were associated with fields and, accordingly, have been updated by application 104 based on the first design generation record and the field association data. In this example, application 104 has: updated element 1002 of design 402 based on the content item of the first design generation record corresponding to field "Name"; updated element 1004 of design 402 based on the content item of the first design generation record corresponding to field "Email"; and updated element 1006 of design 402 based on the content item of the first design generation record corresponding to field "Image 1".

In synthesised design 1010, element 404 of the original design again appears without any modification. Other elements of synthesised design 1010 (i.e., elements 1012, 1014, and 1016) have been updated by application 104 based on the second design generation record and the field association data.

Figure 11:
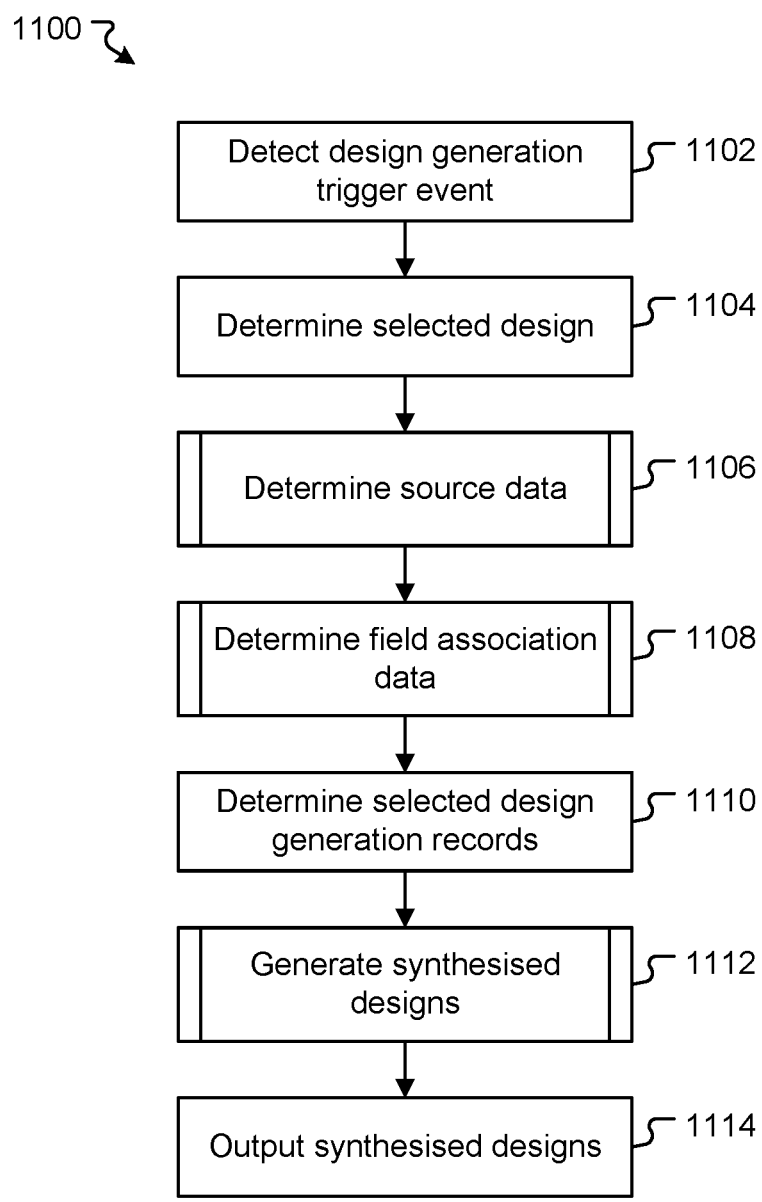
FIG. 11 is a flowchart depicting operations performed to automatically generate designs.

Turning to FIG. 11, a computer implemented method for generating one or more synthesised designs based on a selected design will be described.

The operations depicted in FIG. 11 (and the operations depicted in FIGS. 12 to 14) will be described as being performed by application 104 running on system 102. In alternative embodiments, however, some or all of the processing described may be performed by one or more alternative applications running on system 102 and/or other computer processing systems.

At 1102, application 104 detects a design generation trigger event and, in response, initiates bulk design generation process for creating synthesised designs. This trigger event may, for example, be detecting user interaction with a UI control such as control 412 of FIG. 4 described above.

At 1104, application 104 determines a selected design that will be used as the basis for generating one or more synthesised designs. Application 104 may be configured to determine the selected design in various ways. For example, and with reference to example UI 400 described above, application 104 may be configured to determine that the selected design is the design displayed in the design preview area 302 at the time the design generation trigger event is detected. Alternatively, on detecting the trigger event, application 104 may display a design search user interface via which a user can search or browse for, and select, a particular design (which may then be displayed, e.g. in a design preview area such as area 302).

At 1106, application 104 determines source data that will be used for generating synthesised designs. In the present embodiments, and as described above, the source data will define one or more fields and one or more design generation records. Determining source data is described in relation to FIG. 12 below.

At 1108, application 104 determines the field association data that will be used for generating synthesised designs. In the present embodiments, and as described above, the field association data will define associations between fields (as defined by the source data) and elements of the selected design. Determining field association data is described in relation to FIG. 13 below.

In certain embodiments, application 104 maybe configured to determine a set of selected design generation records at 1110. In this case, application 104 may determine the set of selected design generation records in various ways. For example, application 104 may display a user interface via which a user can select or deselect design generation records (for inclusion in or exclusion from the set of selected design generation records respectively). An example of such a UI is described above with reference to FIG. 9. In alternative embodiments, application 104 may be configured to automatically include all design generation records defined by the source data in the set of selected design generation records (i.e. without facilitating user selection or deselection of particular records).

At 1112, application 104 generates one or more synthesised designs based on the selected design (determined at 1104) and design generation data (which includes the source data determined at 1106, and the field association data determined at 1108). Generating synthesised designs is described in relation to FIG. 14 below.

At 1114, application 104 outputs the synthesised designs generated at 1114. Application 104 may output the synthesised designs in various ways. For example, application 104 may display the synthesised designs in a user interface (for example in the preview region 302 of an editor (or other) UI as described above). In such a UI application 104 may provide controls for navigating through the designs, e.g. a next synthesised design and/or a previous synthesised design type control. Application 104 may also provide controls that allow a user to perform various actions with respect to all synthesised designs or a selected subset of the synthesised designs. These may include controls to initiate: downloading the designs (to local or remote memory); uploading the designs to a remote server; printing the designs; attaching the designs to one or more electronic communications (e.g. emails, instant messages, or other electronic communications); posting the designs on one or more social media sites; and/or alternative output options.

Figure 12:
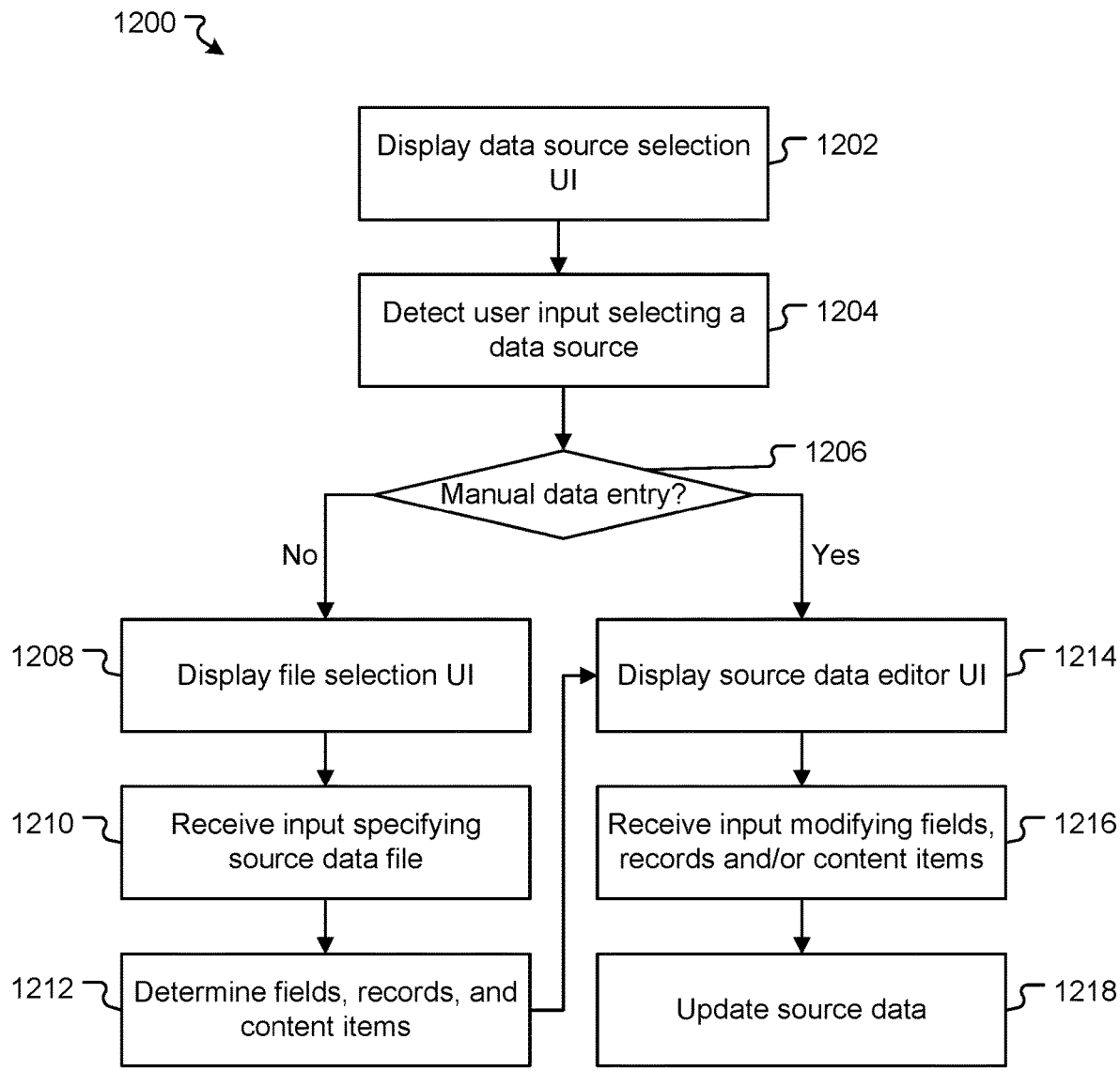
FIG. 12 is a flowchart depicting operations performed to determine source data.

At 1106 of method 1100, application 104 determines source data. Turning to FIG. 12, an example computer implemented method 1200 for determining source data will be described.

At 1202, application 104 displays a data source selection UI. Such a UI may, for example, similar to UI 500 described above. In the present embodiments, data source selection UI provides options to a user to either manually enter source data (e.g. via activation of a control such as 504 described above) or to select a file that already defines (or partially defines) source data (e.g. via a control such as 506 described above).

At 1204, application 104 detects user input selecting a data source. Continuing the above example, this may be user input selecting a manual data entry control such as control 504 or an upload data control such as control 506.

At 1206, application 104 determines the selected data source. If user input selecting the upload data option was detected, processing proceeds to 1208. Alternatively, if user input selecting the manual data entry option was detected, processing proceeds to 1214.

At 1208, application 104 displays a file selection UI enabling the user to select a source data file. A user may interact with a file selection UI to select a file stored on, e.g., the non-transited memory 210 or a remote network location accessible through communications interface(s) 216 of system 102.

At 1210, application 104 receives user input that specifies the source data file. In response to such input, application 104 may retrieve the source file from the specified location and load its contents, e.g., into volatile memory 208 of system 102.

As part of retrieving the content of the specified source file, application 104 may also verify the validity of such file (e.g., appropriateness of storage format, existence of required data such as fields and records). In response to detecting an invalid file, application 104 may display an error message to the user and provide means for the selection of another file (e.g., by returning to 1202 or 1208). Other methods of dealing with an invalid file are possible. For example, application 104 may be configured to terminate method 1200 and its parent method 1100. If application 104 determines that the selected source data file is valid, processing proceeds to 1212.

At 1212, application 104 processes the contents of the file specified at 1210 to determine fields and design generation records (and the content items that make up the design generation records). The source data file may define fields in various manners (e.g., the comma-separated values of the first line of data in a CSV file). Similarly, design generation records and the corresponding content items may also be defined in various manners (e.g., the comma-separated values of lines subsequent to the first line of data in a CSV file). Processing then continues to 1214.

At 1214, application 104 displays a source data editor UI, which enables a user manually define or edit source data. The source data editor UI may, for example, be similar to editor UI 600 described in relation to FIG. 6.

If, at 1204, manual data entry was specified, application 104 may display the source data editor UI with no fields and no design generation records. Alternatively, application 104 may display the source data editor UI with one or more default fields and example design generation records.

At 1216, application 104 may receive user input that modifies the current source data. Such user input may define new fields and/or design generation records, edit existing fields and/or design generation records, and/or delete existing fields and/or design generation records. Such modifications may be achieved, for example, by a user interacting with controls such as 602, 604 and the cells in table 614 in FIG. 6.

Once modifications (if any) to the source data are complete, processing proceeds to 1218 where application 104 stores the source data.

Figure 13:
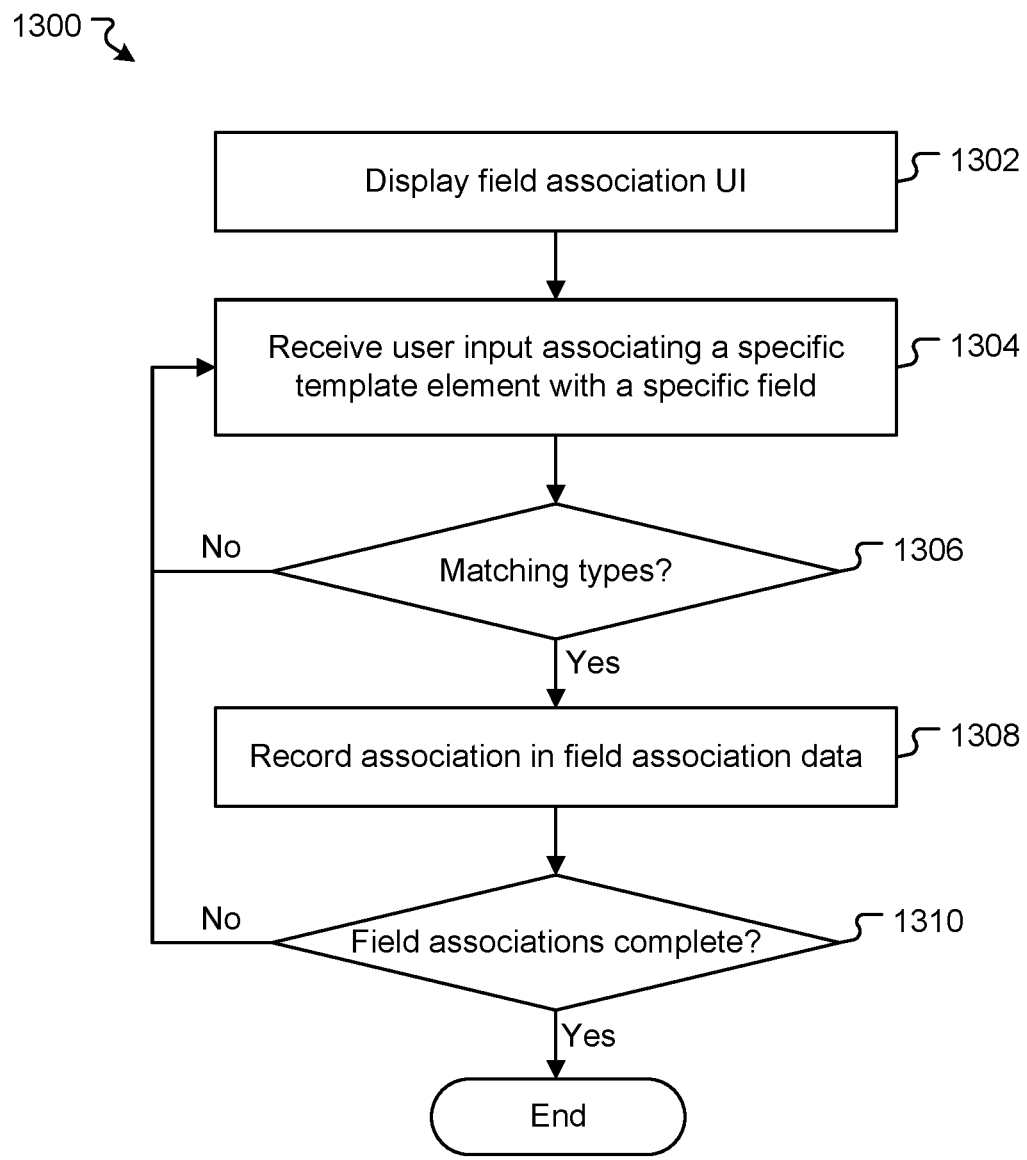
FIG. 13 is a flowchart depicting operations performed to determine field association data.

At 1108 of method 1100, application 104 determines field association data. Turning to FIG. 13, an example computer implemented method for determining field association data will be described.

Application 104 may activate method 1300 in response to, e.g., continue control 610 that was described in relation to FIG. 6 above.

At 1302, application 104 displays a field association UI to enable a user to associate fields (as defined by the source data determined at 1106) with elements of the selected design (as determined at 1104). Such a UI may, for example, be similar to field association UI 700 displayed in the editor UI 400.

At 1304, application 104 detects user interaction associating a specific element of the selected design with a specific field. Application 104 may provide for various field/element association user interactions, e.g., via a drag and drop type interaction (as described in relation to FIG. 7), through a pop-up/context menu interaction (as described in relation to FIG. 8), or via an alternative user interaction.

At 1306, application 104 determines whether the association of 1304 is valid. A field and a design element may be associated only if their corresponding types are compatible (e.g., they are both of text type). If application 104 determines that the field and element types are not compatible, it may discard the association and revert the control back to 1304. Otherwise, application 104 will record a new association in field association data at 1308.

At 1310, application 104 determines whether the association of fields and design elements is complete. In the present example, if application 104 detects further user interaction associating (or editing or deleting) a field/element association processing returns to 1304. Alternatively, if application 104 detects user input indicating that field associations are complete (e.g. user activation of continue control 700 described above) method 1300 ends.

In some implementations application 104 may be configured to require all fields defined by the source data to be associated with a design element before permitting method 1300 to end. In other implementations, application 104 may be configured to permit one or more fields defined by the source data to remain un-associated with any design element. Further, in the present embodiments application 104 is configured to prevent any design element being associated with more than one field. A given field may, however, be associated with more than one design element.

Figure 14:
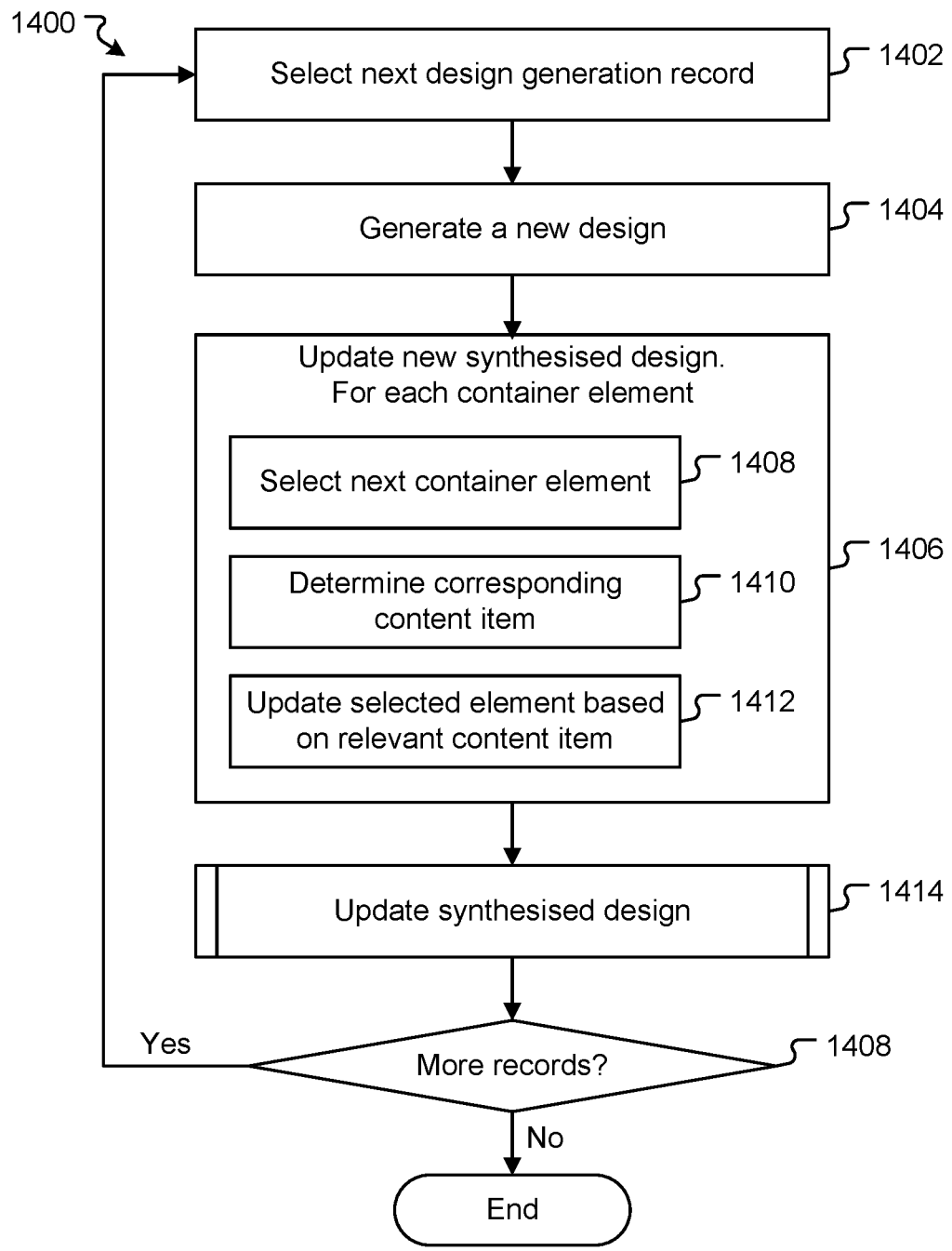
FIG. 14 is a flowchart depicting operations performed to generate a design.

At 1112 of method 1100, application 104 generates synthesised designs. Turning to FIG. 14, an example computer implemented method for generating synthesised designs will be described.

Application 104 may perform method 1400 in response to user input, e.g., user input activating generate designs control 908 described in relation to FIG. 9 above.

At 1402, application 104 selects a design generation record that is defined by the source data and that has not yet been used to generate a design. Where application 104 is configured to allow user selection/deselection of design generation records (e.g. at 1110), it will only select a design generation record at 1402 if it is a "selected" record. Design generation records may be processed in any order, or in parallel.

At 1404, application 104 generates a new synthesised design based on the selected design (determined at step 1104). Application 104 may, for example, generate the new synthesised design at 1404 by creating a copy of the selected design.

At 1406, application 104 updates the newly generated design based on the field association data and the design generation record. Generally speaking, this involves updating each element of the newly generated design that is associated with a field (i.e. each container element) using the content item defined for that field in the design generation record.

At 1408 application 104 selects the next unprocessed container element of the new design generated at 1404. Container elements may be selected and processed in any order. For example, in the present embodiments the field association data defines a set of (field ID, element ID) records. Application 104 may iterate over this dataset processing each record in turn.

At 1410, application 104 determines the corresponding content item that will be used to update the selected container element. In the present example, the selected container element will be associated with a particular field (in the field association data), and the corresponding content item will be the content item that corresponds to that particular field in the selected design generation record.

To illustrate this, consider an example in which: the selected design is design 402 (described above); the source data and field association data are as per the examples described above; and the first design generation record has been selected at 1402 (i.e., the record containing ["John Smith", "js@test.com", "1.jpg"]). In this example, application 104 may: select container element 406 at step 1408 and determine "John Smith" as the corresponding content item at 1410 (i.e., the content item corresponding to the "Name" field in the selected design generation record).

At 1412, application 104 updates the selected container element based on the content item determined at 1410. The manner in which the selected element is updated will depend on the type of the element and the manner in which designs are stored.

By way of example, in the context of the example design format described above, application 104 updates a text-type element by overwriting the "text" attribute of that element with the text defined by the content item determined at 1410. Alternatively, in order to update an image-type element, application 104 overwrites the "asset identifier" attribute of the element with (or based on) the image defined by the content item determined at 1410.

Once all container elements have been updated, processing proceeds to 1414.

At 1414, application 104 determines whether there are any unprocessed design generation records for which a synthesised design is not created. If such design generation records exist, processing proceeds to 1408 where the next unprocessed design generation record is selected. If no unprocessed design generation record exists, method 1400 ends.

Alternative methods for generating a synthesised design based on a selected design, field association data, and a design generation record are possible. For example, instead of creating an entire copy of the selected design, application 104 may be configured generate a new design with relevant data from the selected design (e.g., design type, page size, and any other relevant data). Application 104 may then iterate over the elements of the selected page and determine for each element whether the element is a container element or not. If the element is a container element, application 104 copies an updated version of the element to the new design (the update based on the relevant content item of the design generation record). If the element is not a container element, application 104 copies the element in its original form to the new design.

Where application 104 operates to display controls, interfaces, or other objects, application 104 does so via one or more displays that are connected to (or integral with) system 102—e.g. display 218. Where application 104 operates to receive or detect user input, such input is provided via one or more input devices that are connected to (or integral with) system 102—e.g. a touch screen, a touch screen display 218, a cursor control device 224, a keyboard 226, and/or an alternative input device.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

The present disclosure may use terms such as "first," "second," etc. to distinguish between various elements or features. When used in this manner, these terms are intended only to distinguish elements from one another and not connote order. For example, one user input may be termed a first user input solely in order to distinguish from another user input (which may be referred to as a second user input). In this case, the words "first" and "second" do not imply or require order. The second user input could occur before the first user input (or without a first user input ever occurring).

Any background information described in this specification is background information known to the inventors. Reference to this information as background information is not an acknowledgment or suggestion that this background information is prior art or is common general knowledge to a person of ordinary skill in the art.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for generating a plurality of synthesised designs based on a selected design, wherein the selected design includes a first element associated with a first content item and a second element, and wherein the computer implemented method includes:
    accessing, by a computer processing system, design generation data stored in a non-transitory computer-readable storage medium, the design generation data including:
        source data defining a first field, a first design generation record, and a second design generation record, wherein:
            the first design generation record defines a second content item that is an image-type content item associated with the first field; and
            the second design generation record defines a third content item that is an image-type content item associated with the first field; and
        field association data defining a first association between the first field and the first element;
    generating, by the computer processing system, a first synthesised design, wherein the first synthesised design is generated to include:
        a first synthesised element that is based on the first element but is associated with the second content item instead of the first content item; and
        a first copy of the second element;
    generating, by the computer processing system, a second synthesised design, wherein the second synthesised design is generated to include:
        a second synthesised element that is based on the first element but is associated with the third content item instead of the first content item; and
        a second copy of the second element; and
    outputting, by the computer processing system, the first and second synthesised designs to a display device or a storage device.

2. The computer implemented method of claim 1, wherein prior to accessing the design generation data the method further includes detecting user input defining the first association.

3. The computer implemented method of claim 2, wherein the method further includes:
    displaying a field association user interface (UI) that includes:
        a first field indicator corresponding to the first field; and
        a preview of the selected design, the preview of the selected design including
            a first UI object that corresponds to the first element;
    and wherein the user input defining the first association is user input that drags the first field indicator and drops the first field indicator on or near the first UI object.

4. The computer implemented method of claim 2, wherein the method further includes:
    displaying a preview of the selected design, the preview of the selected design including a first UI object that corresponds to the first element; and
    in response to user input selecting the first UI object, displaying a menu that includes a first menu item that corresponds to the first field;
    and wherein the user input defining the first association is user input selecting the first menu item.

5. The computer implemented method of claim 1, wherein:
    the selected design includes a third element associated with a fourth content item;
    the source data defines a second field;
    the first design generation record defines a fifth content item that is associated with the second field;
    the second design generation record defines a sixth content item that is associated with the second field;
    the field association data defines a second association between the second field and the third element;
    the first synthesised design is generated to include a third synthesised element that is based on the third element but is associated with the fifth content item instead of the fourth content item; and
    the second synthesised design is generated to include a fourth synthesised element that is based on third element but is associated with the sixth content item instead of the fourth content item.

6. The computer implemented method of claim 5, wherein the fifth and sixth content items are image-type content items.

7. The computer implemented method of claim 5, wherein the fifth and sixth content items are audio-type content items.

8. The computer implemented method of claim 5, wherein the fifth and sixth content items are video-type content items.

9. The computer implemented method of claim 1, further including displaying the source data in a data editor UI, the data editor UI including a table, the table having a first column representing the first field, a first row representing the first design generation record, and a second row representing the second design generation record.

10. The computer implemented method of claim 9, wherein the data editor UI includes a first add field control and method further includes:
    detecting user input activating the first add field control; and
    in response to detecting the user input activating the first add field control, adding a third field to the source data.

11. The computer implemented method of claim 10, wherein:
    the first add field control is an add image field control; and
    the third field that is added to the source data is an image-type field that can only be associated with an image-type content item.

12. The computer implemented method of claim 10, wherein:
    the first add field control is an add audio field control; and
    the third field that is added to the source data is an audio-type field that can only be associated with an audio-type content item.

13. The computer implemented method of claim 10, wherein:
the first add field control is an add video field control; and
the third field that is added to the source data is a video-type field that can only be associated with a video-type content item.

14. The computer implemented method of claim 1, wherein the source data is retrieved from a source data file.

15. The computer implemented method of claim 1, further including displaying the first synthesised design.

16. The computer implemented method of claim 1, further including displaying the second synthesised design.

17. A computer processing system including:
at least one computer processing device; and
a non-transitory computer-readable storage medium storing instructions, which when executed by the at least one computer processing device, cause the at least one computer processing device to perform a method for generating a plurality of synthesised designs based on a selected design, wherein the selected design includes a first element associated with a first content item and a second element, and wherein the method comprises:
accessing design generation data stored in a non-transitory computer-readable storage medium, the design generation data including:
source data defining a first field, a first design generation record, and a second design generation record, wherein:
the first design generation record defines a second content item that is an image-type content item associated with the first field; and
the second design generation record defines a third content item that is an image-type content item associated with the first field; and
field association data defining a first association between the first field and the first element;
generating a first synthesised design, wherein the first synthesised design is generated to include:
a first synthesised element that is based on the first element but is associated with the second content item instead of the first content item; and
a first copy of the second element;
generating a second synthesised design, wherein the second synthesised design is generated to include:
a second synthesised element that is based on the first element but is associated with the third content item instead of the first content item; and
a second copy of the second element; and
outputting the first and second synthesised designs to a display device or a storage device.

18. A non-transitory storage medium storing instructions executable by a computer processing system to cause the computer processing system to perform a method for generating a plurality of synthesised designs based on a selected design, wherein the selected design includes a first element associated with a first content item and a second element, and wherein the method comprises:
accessing design generation data stored in a non-transitory computer-readable storage medium, the design generation data including:
source data defining a first field, a first design generation record, and a second design generation record, wherein:
the first design generation record defines a second content item that is an image-type content item associated with the first field; and
the second design generation record defines a third content item that is an image-type content item associated with the first field; and
field association data defining a first association between the first field and the first element;
generating a first synthesised design, wherein the first synthesised design is generated to include:
a first synthesised element that is based on the first element but is associated with the second content item instead of the first content item; and
a first copy of the second element;
generating a second synthesised design, wherein the second synthesised design is generated to include:
a second synthesised element that is based on the first element but is associated with the third content item instead of the first content item; and
a second copy of the second element; and
outputting the first and second synthesised designs to a display device or a storage device.

* * * * *